US006731738B1

United States Patent
Qiu et al.

(10) Patent No.: US 6,731,738 B1
(45) Date of Patent: *May 4, 2004

(54) CALL TONES IN COMMUNICATION NETWORKS

(75) Inventors: Chaoxin Charles Qiu, Olathe, KS (US); Shannon P. Silvus, Penfield, NY (US); Richard N. Kennedy, Naperville, IL (US); Michael J. Gettles, Olathe, KS (US); William Douskalis, Centreville, VA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,057

(22) Filed: Mar. 28, 2000

(51) Int. Cl.⁷ ................................................ G06F 11/00
(52) U.S. Cl. ...................... 379/219; 379/22.01; 714/43; 714/14
(58) Field of Search .................... 379/219, 230, 379/22.01, 22.02, 22.03; 370/525, 526; 714/43, 4, 18, 55, 749, 714

(56) References Cited

U.S. PATENT DOCUMENTS

| 5,438,570 | A |   | 8/1995  | Karras et al. |         |
|-----------|---|---|---------|---------------|---------|
| 5,692,043 | A | * | 11/1997 | Gliga et al.  | 379/399 |
| 6,333,931 | B1| * | 12/2001 | LaPier et al. | 370/385 |

FOREIGN PATENT DOCUMENTS

| WO | WO 98/23053 | 5/1998 |
|----|-------------|--------|
| WO | WO 99/28827 | 6/1999 |

OTHER PUBLICATIONS

Bandow, "Die Continuity Check–Prozedur," Zeichengabesysteme LTU Vertriebsgesellswchaft MBH, 1995, pp. 149–150, XP–002214715.

* cited by examiner

Primary Examiner—William J. Deane, Jr.

(57) ABSTRACT

A communication hub for providing call tones in a communication network proximate the calling device. The communication hub comprises an interface coupled to a processor and a tone generator. The tone generator is configured to generate call tones. The processor is configured to process an in-band call tone request message to direct the tone generator to provide the call tones to a call device. The interface is configured to receive the call tone request message and provide the call tones to the call device.

56 Claims, 9 Drawing Sheets

CALL TONES IN COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication networks, and specifically, to a method and system for providing call tones in communication networks.

2. Description of the Prior Art

Call tones are generated in communication networks to provide callers with feedback regarding the status of calls and call connections. Examples of specific call tones include a dial tone, a ringback tone, a busy signal tone, and a reorder tone. The reorder tone is sometimes referred to as a fast busy signal in the art. Typically, call tones are provided in communication networks by a terminating communication device upon completion of the call connection. In some applications however, call tones can be provided by an originating communication device by triggering the call tone generation using a control or signaling channel.

Figure 1:
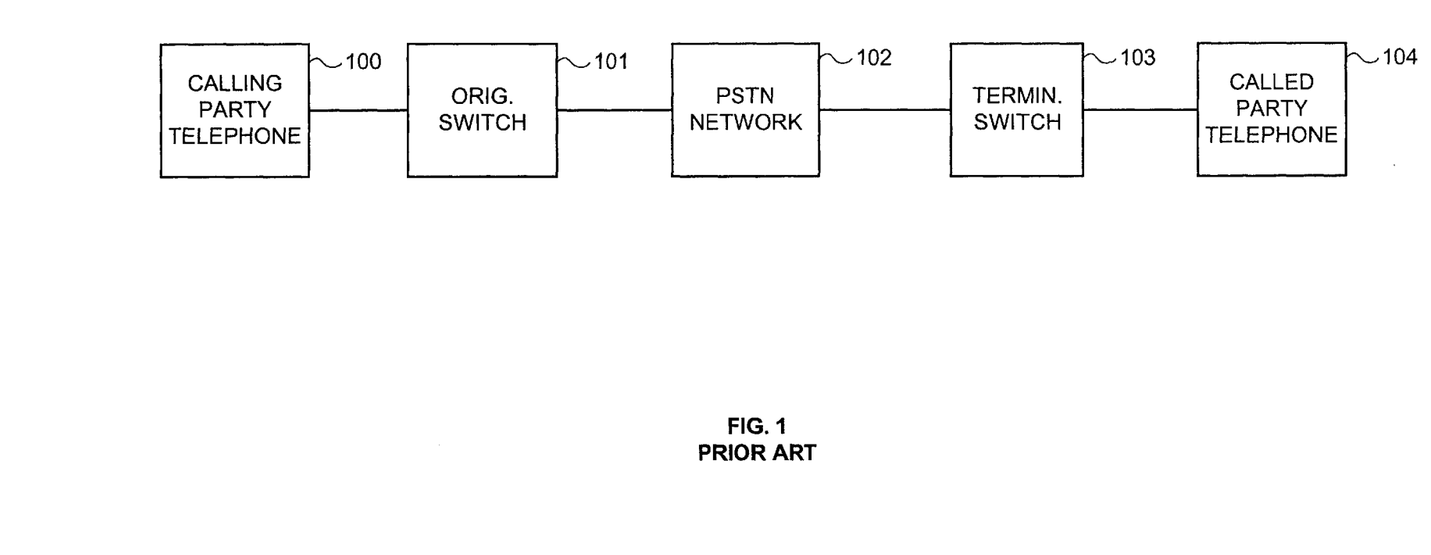
FIG. 1 illustrates an example of a prior art communication network.

FIG. 1 illustrates an example of call tone control and generation for a call session in the PSTN. On FIG. 1 the calling party removes the receiver from the calling party's telephone 100. The originating switch 101 detects the off-hook and provides a dial tone to the calling party's telephone 100. Responsive to receiving the dial tone, the user enters the digits for a call destination. The originating switch 101 processes the entered digits and provides a call setup message to the network 102. The network 102 provides the call setup message to the terminating switch 103 and reserves a connection between the originating switch 101 and the terminating switch 103. In response to receiving the call setup message, the terminating switch 103 provides an acknowledgment message to the network 102. If the terminating switch 103 detects the called party's telephone 104 is off-hook or busy, the terminating switch 103 provides busy signal tones over the network 102 to the calling party's telephone 100. If the terminating switch 103 does not detect that the called party's telephone 104 is off-hook or busy, the terminating switch 103 provides ringback tones over the network 102 to the calling party's telephone 100. The terminating switch 103 also rings the called party's telephone 104 to announce the incoming call.

Figure 2:
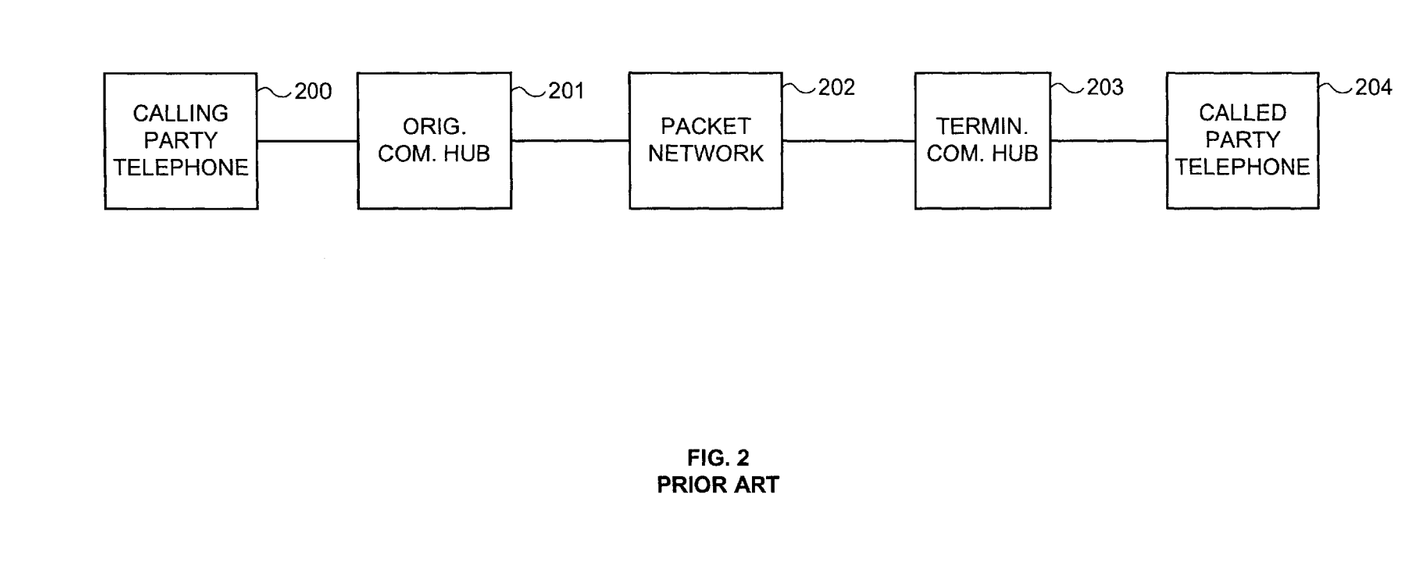
FIG. 2 illustrates another example of a prior art communication network.

FIG. 2 illustrates another example of call tone generation and control for a call session in a packet communication network. On FIG. 2 the calling party removes the receiver from the calling party's telephone 200. The originating communication hub 201 detects the off-hook event and provides an off-hook message to the network 202. Responsive to receiving the off-hook message, the network 202 provides a dial tone to the calling party's telephone 200 via the originating communication hub 201. Responsive to receiving the dial tone the user enters the digits for the call destination. The originating communication hub 201 detects the digits and provides the digits to the network 202. The network 202 processes the digits and generates a setup message for a terminating communication hub 203 connected to the called party's telephone 204. Responsive to receiving the setup message, the terminating communication hub 203 provides a setup acknowledgment message to the network 202. If the called party's telephone 204 is off-hook or busy, the terminating communication hub 203 provides busy signal tones over the network 202 and communication hub 201 to the calling party's telephone 200. If the terminating communication hub 203 does not detect the called party's telephone 203 is off-hook or busy, the terminating communication hub 203 provides ringback tones over the network 202 and communication hub 201 to the calling party's telephone 200. The terminating communication hub 203 also rings the called party's telephone 204 to announce the incoming call.

It is a problem in packet communication networks to provide call tones over the network from the terminating device. The communication path between the communication hub and the network includes a limited bandwidth capacity. Unfortunately, effective call tone generation is not supported because new services such as call waiting, call forwarding, and three-way-calling have increased network bandwidth demands. Therefore, a need exists in the art to free bandwidth currently utilized by call tone generation and control in packet communication networks.

SUMMARY OF THE INVENTION

The present invention advances the art by providing a communication hub that provides call tones in communication networks at points proximate the calling device. Advantageously, bandwidth required for call completion in the communication network is significantly reduced because call tones are provided proximate the calling device using in-band call tone messaging. Also advantageously, the in-band call tone messaging could also serve as a validation that the bearer channel is functioning properly before call completion. Thus, service assurance is provided before call completion and early detection of network failures is realized. Some examples of call tones that could be provided include without limitation, ringback tones, busy signal tones, and reorder tones.

The communication hub is comprised of an interface coupled to a processor and a tone generator. The tone generator is configured to generate the call tones under control of the processor. The processor is configured to process an in-band call tone request message to direct the tone generator to provide the call tones to a call device. The interface is configured to receive the call tone request message and transmit the call tones to the call device.

In the context of the present invention the first, second, third, fourth, etc. connotations used to reference the messages, the calls, and the devices are used for the purpose of differentiating between different messages, different calls, and different devices and are not used to indicate a message sequence, call sequence or processing sequence. Also in the context of the present invention, an on-network call session is defined as a call session between two devices connected to the same communication network. An off-network to on-network call session and an on-network to off-network call session are defined as an incoming call session or an outgoing call session, respectively, between two devices connected to different communication networks. For example, an incoming call session or an outgoing call session between a call device connected to a packet network and a call device connected to the PSTN. In-band is defined as using the bearer portion of a communication path, for example, over the bearer channel in an asynchronous transfer mode (ATM) connection. Those skilled in the art will appreciate that in some environments, such as an Internet Protocol (IP) environment, in-band could simply be a pair of addresses, such as the address of the originating device and the address of the terminating device.

DETAILED DESCRIPTION OF THE PREFERRED EMBODIMENT

Figure 3:
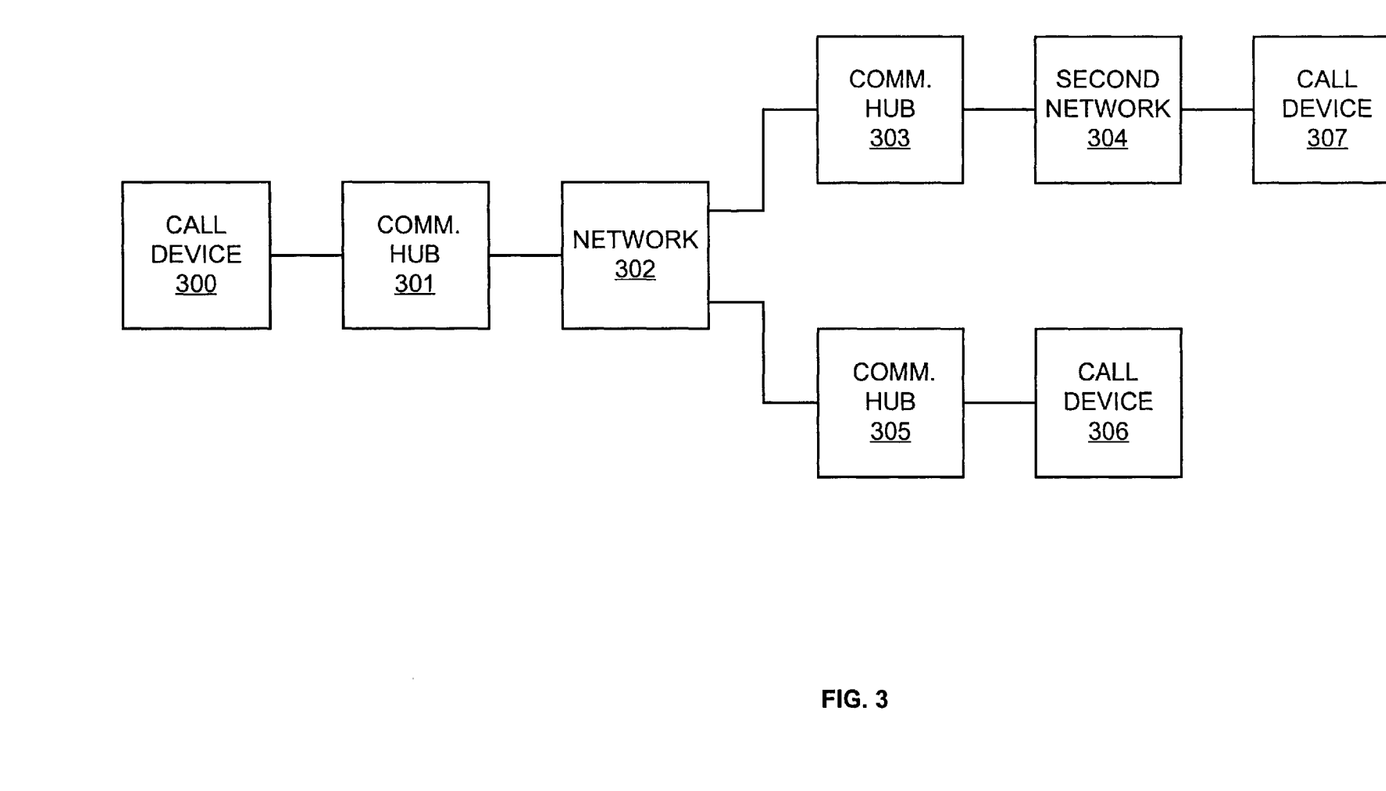
FIG. 3 illustrates an example of a network architecture according to the present invention.

FIG. 3 illustrates a network architecture according to the present invention. FIG. 3 depicts call devices 300, 306, and 307, communication hubs 301, 303, and 305, communication network 302, and second communication network 304. Communication hub 301 is connected to call device 300 and communication network 302. Communication network 302 is connected to communication hubs 303 and 305. Communication hub 305 is connected to call device 306. Second communication network 304 is connected to communication hub 303 and call device 307.

Call devices 300, 306, and 307 could be conventional call devices that use digital and analog telephony format. Some examples of call devices 300, 306, and 307 are devices configured to provide voice, data, and video communications. Communication network 302 and second communication network 304 could be different communication networks. In some examples of the present invention, communication network 302 is a packet network and second communication network 304 could be any other network including without limitation, a wireless network, a packet network, an internet, or the PSTN. Those skilled in the art will appreciate the communication networks 302 and 304 would include various conventional components not shown on FIG. 3 for clarity.

Communication hub 301, could be any communication device capable of: 1) receiving an in-band call tone request message that includes a request to provide call tones to call device 300, and 2) process the call tone request message to provide call tones to call device 300. Communication hub 305 could be any communication device capable of: 1) providing the call tone request message that includes the request to provide call tones to call device 300, and 2) process a confirmation message that confirms the call tones are being provided to call device 300. Some examples of communication hubs 301 and 305 include without limitation, a switch, a private branch exchange (PBX), and a residential communication hub. Communication hub 301 could also incorporate the features of communication hub 305 to generate an in-band call tone request message to provide call tones to call device 306 and process a confirmation message that confirms call tones are being provided to call device 306. Similarly, communication hub 305 could incorporate the features of communication hub 301 to receive the call tone request message and provide call tones to call device 306.

Communication hub 303, could be any communication device capable of interfacing between communication network 302 and second communication network 304. Communication hub 303 could also incorporate the features of communication hubs 301 and 305 to process an in-band call tone request message to provide call tones to call device 307. Communication hub 303 could also generate call tone request messages for communication hubs 301 and 305 to provide call tones to call devices 300 and 306 respectively. Communication hub 303 could also process confirmation messages confirming the call tones are being provided to call devices 300 and 306. Communication hub 303 could also interface between communication network 302 and second communication network 304 to provide call tones generated by second communication network 304 to one of call devices 300 and 306. Some examples of communication hub 303 include without limitation, a network a voice gateway, a PBX, and a switch.

Figure 4:
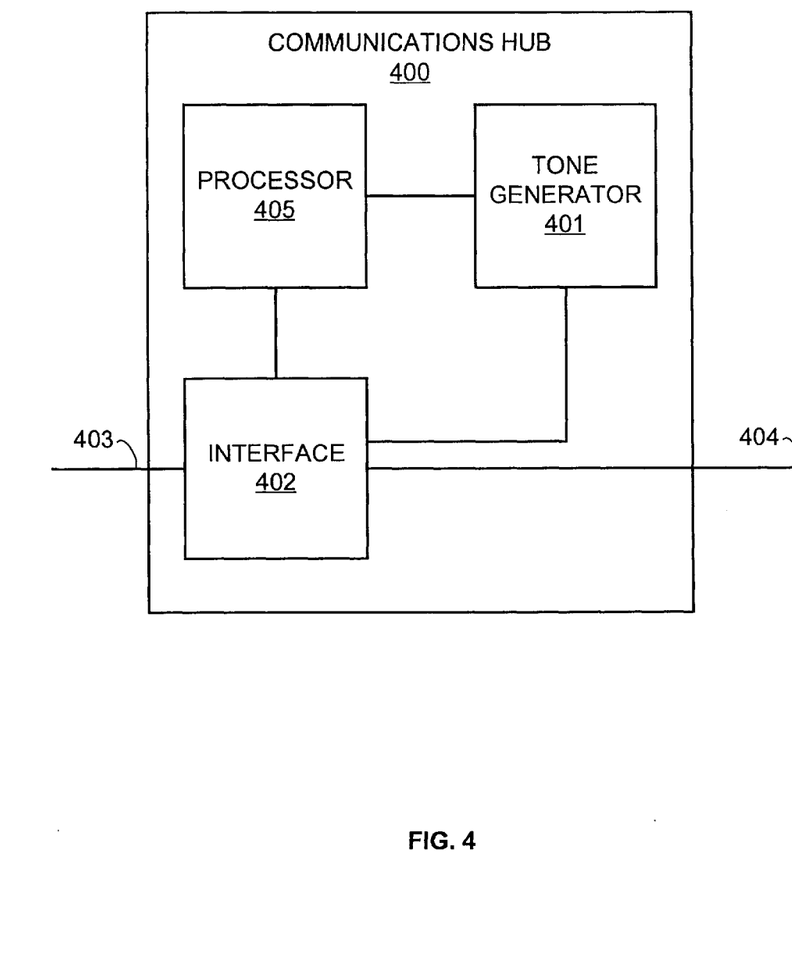
FIG. 4 illustrates an example of a communication hub according to the present invention.

The Communication Hub—FIG. 4

FIG. 4 depicts an example of communication hubs 301, 303, and 305 according to the present invention, namely communication hub 400. Those skilled in the art will appreciate numerous variations that do not depart from the present invention. Those skilled in the art will also appreciate that various features described below could be combined with the above described embodiment to form multiple variations of the invention.

Communication hub 400 is comprised of a processor 405, a tone generator 401, and an interface 402. Interface 402 is connected to processor 405, tone generator 401, and communication paths 403 and 404. Communication paths 403 and 404 could be conventional communication paths. Processor 405 is also connected to tone generator 401. Those skilled in the art will appreciate that in some embodiments of the invention tone generator 401 and interface 402 could be a part of processor 405, such as where tone generator 401 and interface 402 are in the same processing circuitry or included on the same chip as processor 405. Those skilled in the art will also understand that communication hub 400 typically would include other conventional components not shown on FIG. 4 for clarity, depending on the type of device and its operation in a network environment.

Processor 405 could be any processor capable of processing various messages to: 1) direct tone generator 401 to provide the call tones to a call device, 2) direct tone generator 401 to stop providing the call tones to the call device, 3) provide confirmation that the call tones were provided to the call device, and 4) generate in-band call tone request messages for other communication hubs; and 5) process confirmations from other communication hubs that call tones were provided to other call devices. Tone generator 401 could be a conventional device that provides call tones under the control of processor 405.

Interface 402 could be any interface that receives messages for processor 405 and transmits messages for processor 405. Interface 402 could also be a voice interface that acts as a POTS interface or packet interface, supervises messages, channels voice communications, or resolves contention between voice lines or voice communication paths. Interface 402 could also be a data or video interface that manages data stream, video stream, performs asynchronous time division, or concentrates data and video lines or paths. One example of interface 402 includes without limitation an asynchronous transfer mode (ATM) interface capable of handling ATM messaging for processor 405 over communication path 404 and capable of handling analog signaling for processor 405 over communication path 403. Interface 402 could handle numerous such communication paths although only communication paths 403 and 404 are shown for clarity.

Operation FIGS. 5–9.

FIGS. 5–9 are a message sequence chart illustrating various examples of the operation of a communication hub according to the present invention. It is anticipated, however, that various modifications to these examples will be readily apparent to those skilled in the art. The principles defined herein may also be applied to other embodiments without the use of inventive faculty. Thus, the present invention is not intended to be limited to the examples shown below but is to be accorded the widest scope consistent with the principles and novel features disclosed herein.

Figure 5:
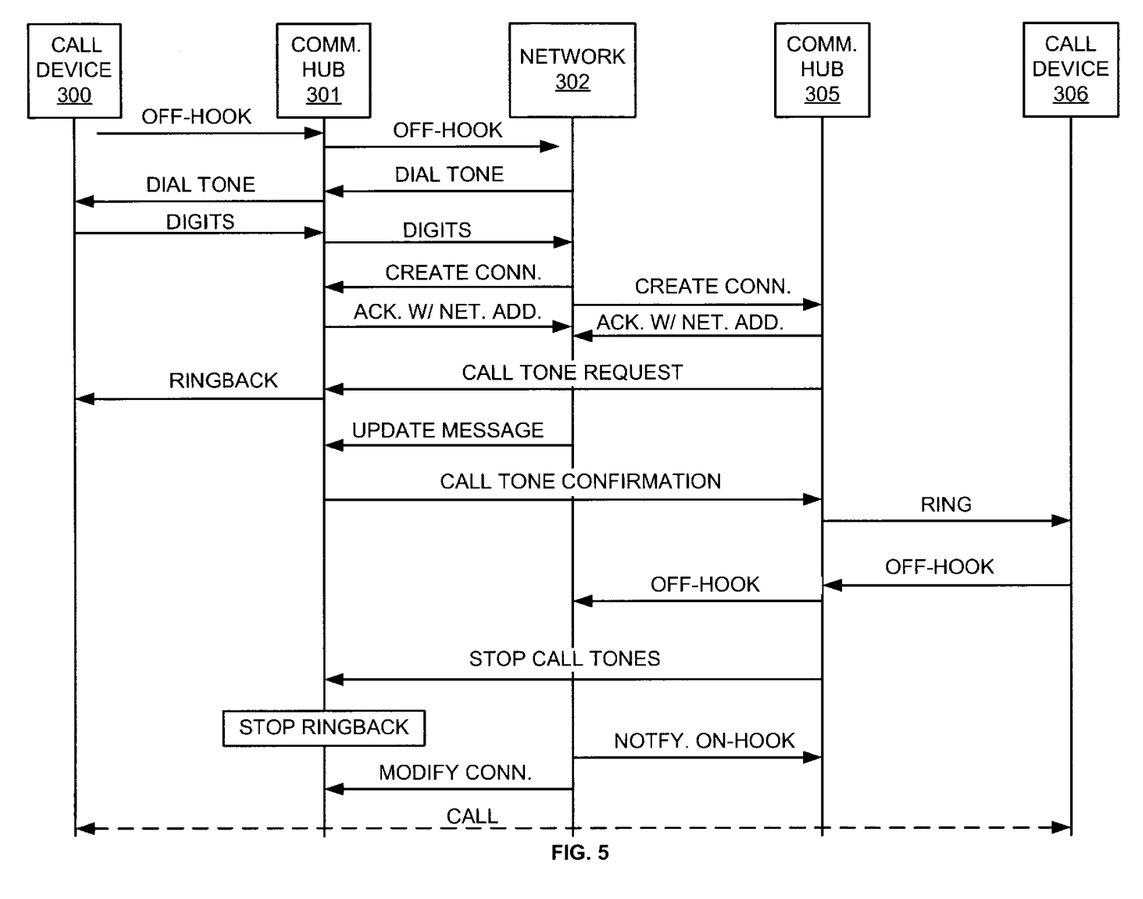
FIG. 5 is a message sequence chart illustrating an example of an on-network call session according to the present invention.

FIG. 5 is a message sequence chart illustrating an example according to the present invention of an on-network call session between communication hubs 301 and 305. In this example communication hub 301 is the originating communication hub for the call and communication hub 305 is the terminating communication hub for the call. On FIG. 5 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between network 302 and communication hub 305. Responsive to the connection setup, communication hub 305 provides an acknowledgment message to communication network 302. The acknowledgment message includes the network address of communication hub 305. The create connection message to communication hub 305 includes the address of communication hub 301 and includes an instruction for ring and ringback tones. Responsive to the ring and ringback instruction, communication hub 305 provides an in-band call tone request message to communication hub 301. The call tone request message includes a request for communication hub 301 to provide ringback tones to call device 300. In some examples of the present invention, the call tone request message could be triggered by the completion of the connection setup rather than the network instruction.

Responsive to receiving the call tone request message, communication hub 301 provides the ringback tones to call device 300. Substantially concurrently, communication network 302 updates communication hub 301 with the address of communication hub 305. Responsive to the update message, communication hub 301 provides an in-band call tone confirmation message to communication hub 305. Alternatively, the call tone confirmation message could be provided over the signaling channel. The call tone confirmation message includes a confirmation that the ringback tones are being provided to call device 300. Responsive to receiving the confirmation message, communication hub 305 rings call device 306 to announce the incoming call. In some examples of the invention, communication hub 301 may not transmit the confirmation message to communication hub 305. In this case communication hub 305 rings call device 306 responsive to the time-out of an internal timer.

Responsive to receiving an off-hook signal from call device 306, communication hub 305 provides an off-hook message to communication network 302. Substantially concurrently, communication hub 305 provides an in-band stop call tones message to communication hub 301. Alternatively, the stop call tones message could be provided over the signaling channel. Communication hub 301, responsive to receiving the stop call tones message, stops providing the ringback tones to call device 300. Responsive to receiving the off-hook message, communication network 302 sends a request for on-hook notification message to communication hub 305 and modifies the connection between communication network 302 and communication hub 301 to a full duplex bearer connection to complete the call.

In some examples of the invention, communication hub 305 starts a timer after sending the call tone request message to communication hub 301. If communication hub 301 does not respond before the timer times-out, communication hub 305 provides an error message to communication network 302 and the call is cleared. Similarly, communication network 302 starts a timer while waiting for the off-hook message from communication hub 305. If the timer times-out before the off-hook message is received, communication network 302 could either perform call forwarding for subscribed customers or stop the call tones and clear the call.

In examples where the called party doesn't answer and the call is forwarded to another party, communication network 302 sends an instruction to communication hub 305 to stop ringing call device 306. Communication network 302 then forwards the call to another communication hub connected to the forwarded call device and the new communication hub exchanges the call tone request message, and in some examples, the confirmation message with communication hub 301. In this case, communication hub 301 recognizes the request is from the same calling party but for a different destination and continues providing the ringback tones.

In yet another example, where the called party doesn't answer and the call is forward to a voice response device, the communication hub 305 could respond to the receipt of audio information to stop providing the ringback tones.

Figure 6:
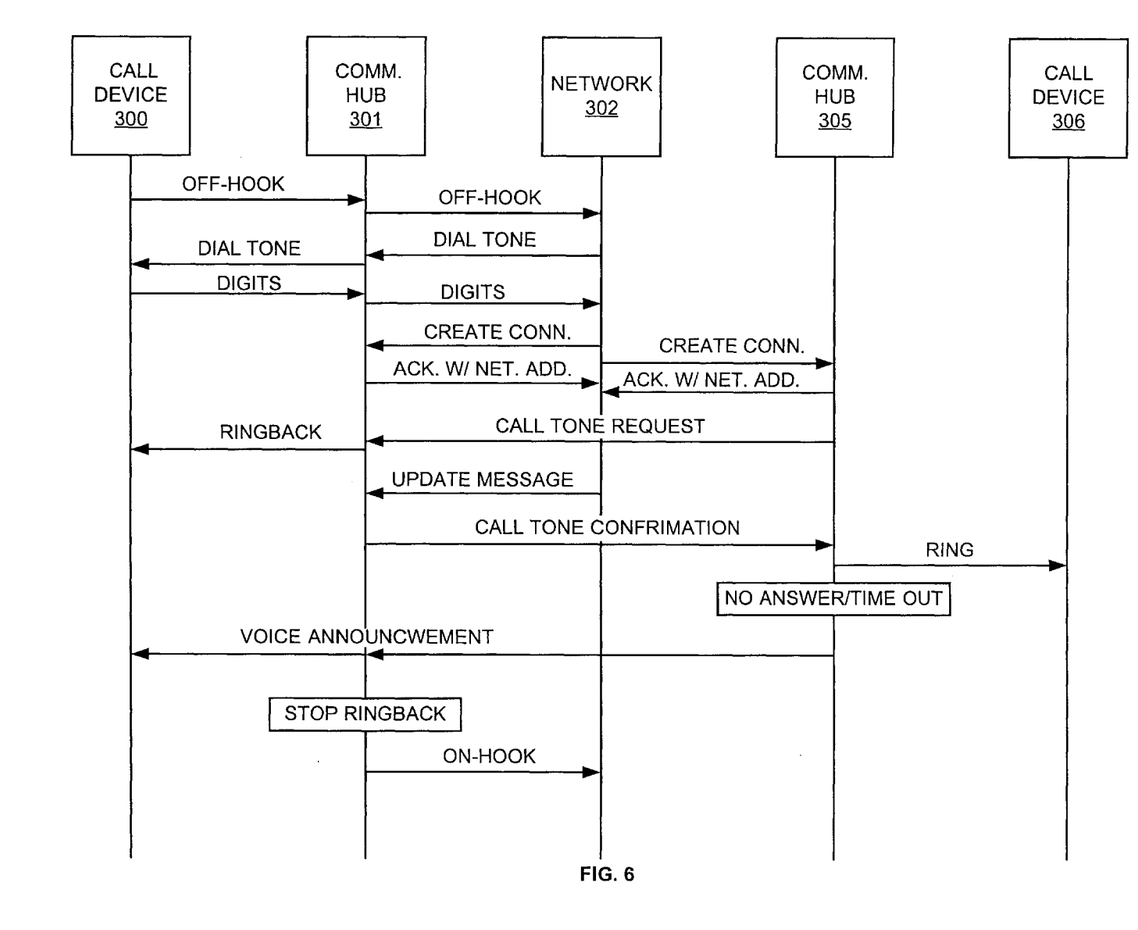
FIG. 6 is a message sequence chart illustrating an example of an on-network call session according to the present invention where the called device is busy.

FIG. 6 is a message sequence chart illustrating an example according to the present invention of an on-network call session between communication hubs 301 and 305 where call device 306 is not answered. In this example communication hub 301 is the originating communication hub for the call and communication hub 305 is the terminating communication hub for the call. On FIG. 6 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between network 302 and communication hub 305. Responsive to the connection setup, communication hub 305 provides an acknowledgment message to communication network 302. The acknowledgment message includes the network address of communication hub 305. The create connection message to communication hub 305 includes the address of communication hub 301 and includes an instruction for ring and ringback tones. Responsive to the ring and ringback instruction, communication hub 305 provides an in-band call tone request message to communication hub 301. The call tone request message includes a request for communication hub 301 to provide ringback tones to call device 300.

Responsive to receiving the call tone request message, communication hub 301 provides the ringback tones to call device 300. Substantially concurrently, communication network 302 updates communication hub 301 with the address of communication hub 305. Responsive to the update message, communication hub 301 provides an in-band call tone confirmation message to communication hub 305. The call tone confirmation message includes a confirmation that the ringback tones are being provided to call device 300. Responsive to receiving the confirmation message, communication hub 305 rings call device 306 to announce the incoming call. Communication hub 305 also starts an internal timer. Responsive to the time-out of the internal timer, communication hub 305 transmits an in-band voice announcement to communication hub 301. The voice announcement indicates that the called party has not answered. Responsive to the voice announcement, communication hub 301 stops playing the ringback tones and provides the voice announcement to the call device 300. Responsive to detecting an on-hook event in call device 300, communication hub 301 provides an on-hook message to the communication network 302. Responsive to the on-hook message, the communication network 302 clears the call connections between the communication hubs 301 and 305 in a conventional manner to end the call session.

Figure 7:
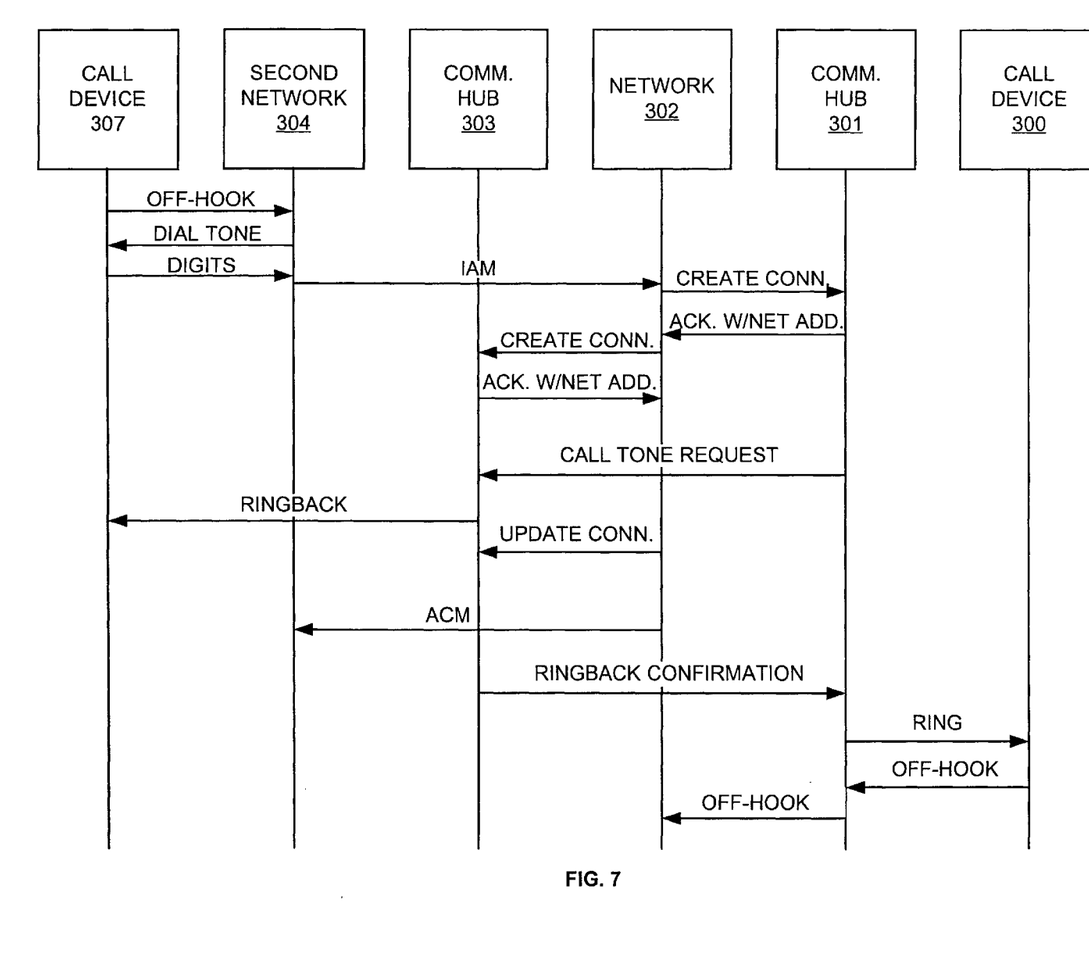
FIGS. 7 and 8 are a message sequence chart illustrating an example of an off-network to on-network call session according to the present invention.
Figure 8:
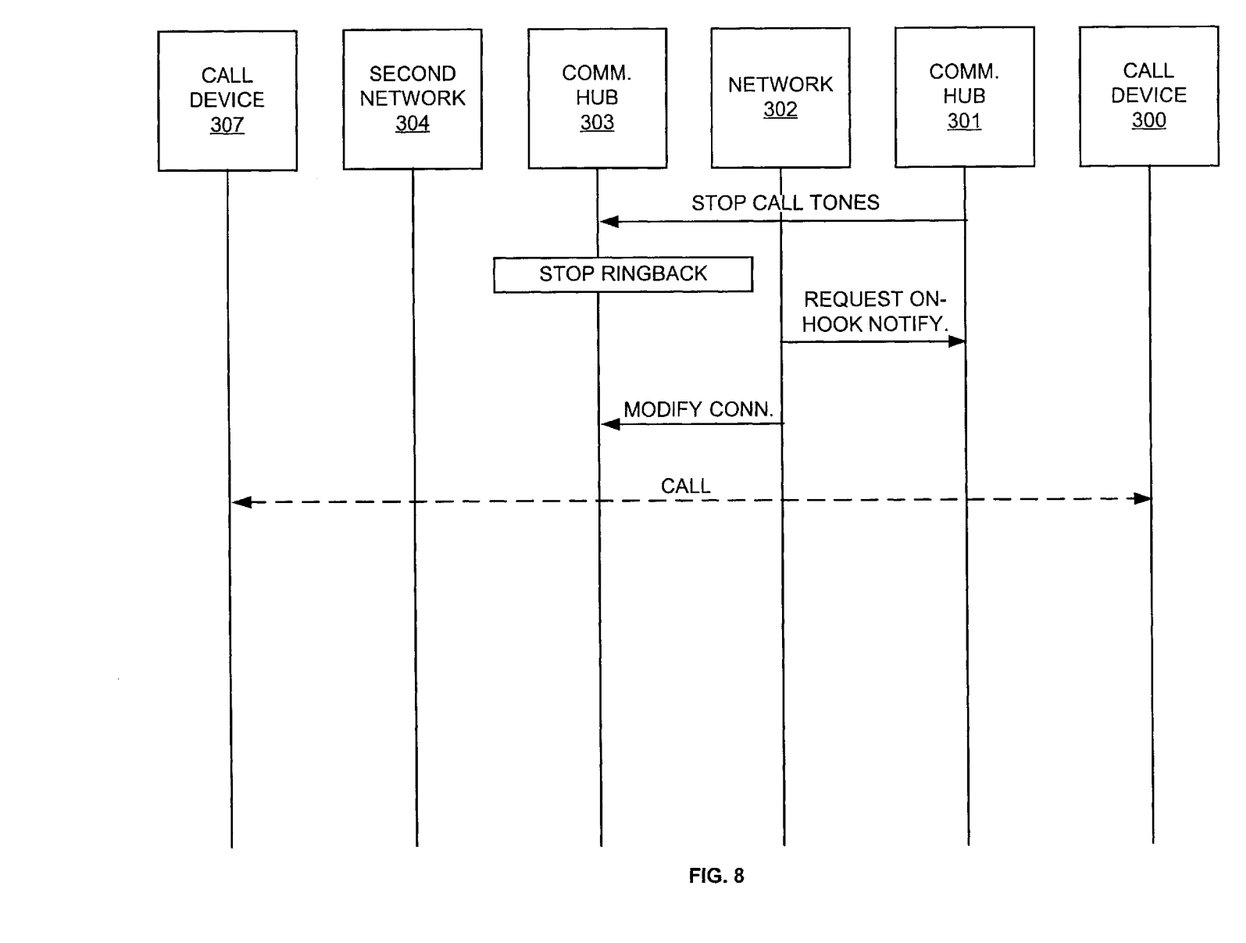

FIGS. 7 and 8 are a message sequence chart illustrating an example according to the present invention of an off-network to on-network call session. In this example, communication hub 303 in communication network 302 is the point proximate the calling device 307 connected to second communication network 304. On FIGS. 7 and 8 call device 307 goes off-hook. Second communication network 304 detects the off-hook event and provides a dial tone to call device 307. Responsive to receipt of caller entered digits, second communication network 304 provides an IAM message to communication network 302 via communication hub 303. Responsive to receiving the IAM message, communication network 302 provides a create connection message to communication hub 301. The create connection message to communication hub 301 creates a full duplex bearer connection between communication network 302 and communication hub 301. Responsive to the connection setup, communication hub 301 provides an acknowledgment message to communication network 302. The acknowledgment message includes the network address of communication hub 301. Responsive to the IAM message, communication network 302 also provides a create connection message to communication hub 303. The create connection message to communication hub 303 creates a half duplex bearer connection between network 302 and communication hub 303. Responsive to the connection setup, communication hub 303 provides an acknowledgment message to communication network 302. The acknowledgment message includes the network address of communication hub 303. The create connection message to communication hub 301 includes the network address of communication hub 303 and includes the ring and ringback instruction. Responsive to the ring and ringback instruction, communication hub 301 provides an in-band call tone request message to communication hub 303. The call tone request message includes a request for communication hub 303 to provide ringback tones to call device 307. It should be noted that in some examples of the present invention, the call tone request message could be triggered by the completion of the connection setup.

Responsive to receiving the call tone request message, communication hub 303 provides ringback tones to call device 307. Substantially concurrently, network 302 updates communication hub 303 with the address of communication hub 301 and provides an ACM message to second communication network 304. Responsive to providing the ringback tones to call device 307, communication hub 303 provides a confirmation message to communication hub 301 that includes a confirmation that the ringback tones are being provided to call device 307. Responsive to receiving the confirmation message, communication hub 301 rings call device 300 to announce the incoming call. In some examples of the invention, communication hub 303 may not transmit the confirmation message to communication hub 301. In this case communication hub 301 would ring call device 300 responsive to the time-out of an internal timer.

Responsive to receiving an off-hook signal from call device 300, communication hub 301 provides an off-hook message to network 302. Substantially concurrently communication hub 301 provides a stop call tones message to communication hub 303. Communication hub 303, responsive to receiving the stop call tones message, stops providing the ringback tones to call device 307. Communication network 302 sends a request for on-hook notification message to communication hub 301 and modifies the connection between communication network 302 and communication hub 303 to a full duplex bearer connection to complete the call.

In some examples of the invention, communication hub 301 starts a timer after sending the call tone request message to communication hub 303. If communication hub 303 does not respond before the timer times-out, communication hub 301 provides an error message to network 302 and the call is cleared. Similarly, network 302 starts a timer while waiting for the off-hook message from communication hub 301. If the timer times-out before the off-hook message is received, network 302 could either perform call forwarding for subscribed customers or stop the ringback tones and clear the call.

In examples where the called party doesn't answer and the call is forwarded to another party, network 302 sends a instruction to communication hub 303 to stop ringing call device 300 and clears the connection. Communication network 302 could forward the call to another communication hub connected to the forwarded call device or use the same communication hub to establish a connection with a new call device. In either case, communication hub 301 recognizes the request is from the same calling party but for a different destination and continues transmission of the ringback tones.

Figure 9:
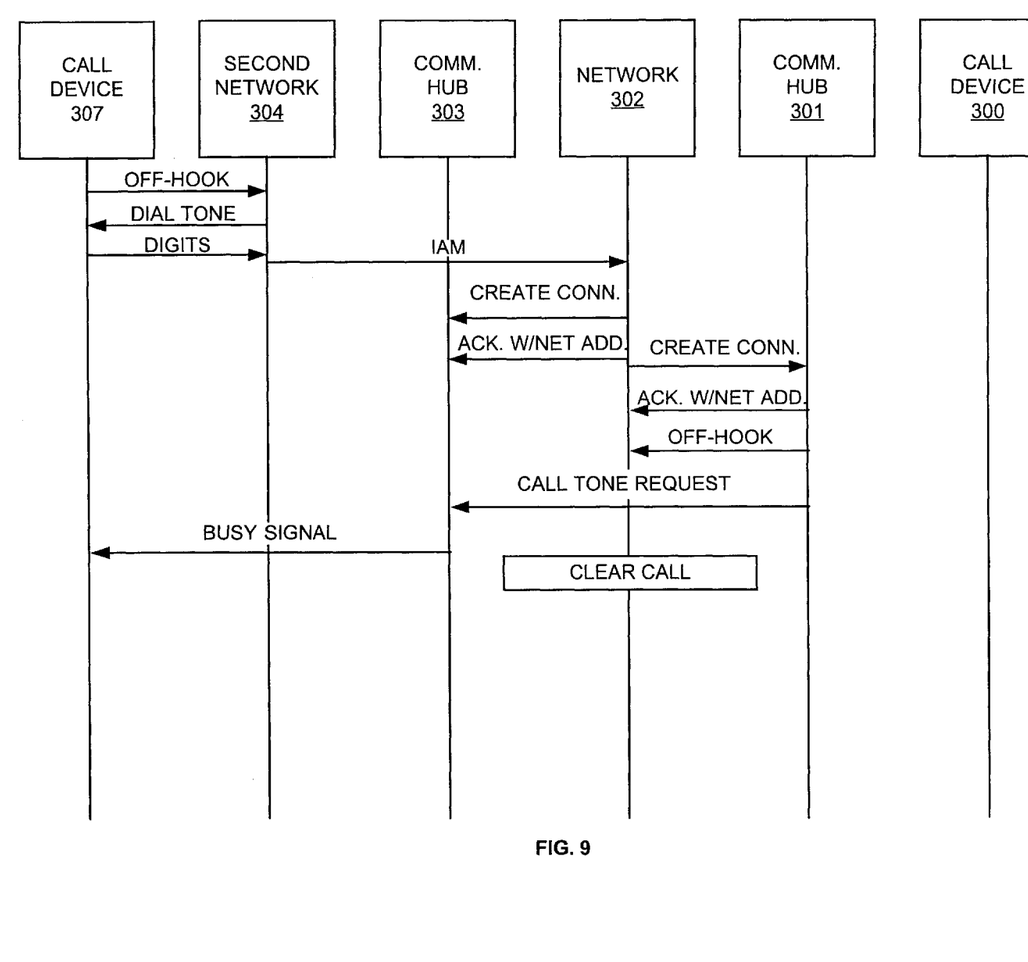
FIG. 9 is a message sequence chart illustrating an example of an off-network to on-network call session according to the present invention where the called device is busy.

FIG. 9 is a message sequence chart illustrating an example according to the present invention of an off-network to on-network call session where the called device 300 is busy. On FIG. 9 call device 307 goes off-hook. Second communication network 304 detects the off-hook event and provides a dial tone to call device 307. Responsive to receipt of caller entered digits, second communication network 304 provides an IAM message to communication network 302 via communication hub 303. Responsive to receiving the IAM message, communication network 302 provides a create connection message to communication hub 301. The create connection message to communication hub 301 creates a full duplex bearer connection between communication network 302 and communication hub 301. Responsive to the connection setup, communication hub 301 provides an acknowledgment message to communication network 302. The acknowledgment message includes the network address of communication hub 301. Responsive to the IAM message, communication network 302 also provides a create connection message to communication hub 303. The create connection message to communication hub 303 creates a half duplex bearer connection between network 302 and communication hub 303. Responsive to the connection setup, communication hub 303 provides an acknowledgment message to communication network 302. The acknowledgment message includes the network address of communication hub 303. The create connection message to communication hub 301 includes the address of communication hub 303 and includes an instruction for ring and ringback tones. Responsive to the ring and ringback instruction, communication hub 301 detects that call device 300 is already off-hook or busy and provides an off-hook message to communication network 302. Substantially concurrently, communication hub 301 provides an in-band call tone request message to communication hub 303. The call tone request message includes a request for communication hub 303 to provide busy signal tones to call device 307. Responsive to receiving the request, communication hub 303 provides busy signal tones to call device 307. Network 302, responsive to receiving the off-hook message, clears the call. Advantageously, the bandwidth required for call completion is significantly reduced because call tones are provided proximate the calling device 307.

Those skilled in the art will appreciate that during an emergency 911 calling scenario, such as an attendant call back scenario where the caller is still in an off-hook state, some special treatment is required. For example, a receiver off-hook signal could be sent to the caller who is off-hook. During this time, audible ringing could be returned to the attendant. After a pre-determined time the connections would be modified to allow the attendant to cut through the audio path.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

We claim:

1. A communication hub comprising:
   a tone generator configured to generate call tones;
   a processor coupled to the tone generator and configured to process an in-band call tone request message to direct the tone generator to provide the call tones to a call device; and
   an interface coupled to the processor and the tone generator and configured to receive the call tone request message and transmit the call tones to the call device.

2. The communication hub of claim 1 wherein the processor is further configured to generate a confirmation message that includes a confirmation that the call tones are being provided to the call device and the interface is further configured to transmit the confirmation message.

3. The communication hub of claim 1 wherein the processor is further configured to process a stop call tones message to direct the tone generator to stop providing the call tones to the call device and the interface is further configured to receive the stop call tones message.

4. The communication hub of claim 1 wherein the processor is further configured to process an arrival of audio information to direct the tone generator to stop providing the call tones to the call device and the interface is further configured to receive the audio information.

5. The communication hub of claim 1 wherein the processor is further configured to generate a second in-band call tone request message, and the interface is further configured to transmit the second call tone request message.

6. The communication hub of claim 5 wherein the processor is further configured to process a second confirmation message to ring the call device and the interface is further configured to receive the second confirmation message.

7. The communication hub of claim 6 wherein the processor is further configured to process an off-hook signal to stop ringing the call device and the interface is further configured to receive the off-hook signal.

8. The communication hub of claim 1 wherein the call tones are ringback tones.

9. The communication hub of claim 1 wherein the call tones are busy signal tones.

10. The communication hub of claim 1 wherein the call tones are reorder tones.

11. The communication hub of claim 1 wherein the communication hub is a switch.

12. The communication hub of claim 1 wherein the communication hub is a residential communication hub.

13. The communication hub of claim 1 wherein the communication hub is a voice gateway.

14. A method of operating a communication hub the method comprising:
receiving an in-band call tone request message;
processing the call tone request message to generate call tones for a call device; and
providing the call tones to the call device.

15. The method of claim 14 further comprising:
responsive to providing the call tones, generating a confirmation message; and
transmitting the confirmation message.

16. The method of claim 14 further comprising:
receiving a stop call tones message; and
processing the stop call tones message to stop providing the call tones to the call device.

17. The method of claim 14 further comprising:
receiving audio information; and
processing the audio information to stop providing the call tones to the call device.

18. The method of claim 14 further comprising:
generating a second in-band call tone request message; and
transmitting the second call tone request message.

19. The method of claim 18 further comprising:
receiving a second confirmation message; and
processing the second confirmation message to ring the call device.

20. The method of claim 19 further comprising:
receiving an off hook signal; and
processing the off-hook signal to stop ringing the call device.

21. The method of claim 14, wherein the call tones are ringback tones.

22. The method of claim 14 wherein the call tones are busy signal tones.

23. The method of claim 14 wherein the call tones are reorder tones.

24. The method of claim 14 wherein the communication hub is a voice gateway.

25. The method of claim 14 wherein the communication hub is a switch.

26. The method of claim 14 wherein the communication hub is a residential communication hub.

27. A communication system comprising:
a first communication hub connected to a first call device;
a second communication hub connected to a second call device, wherein the second communication hub is configured to provide an in-band call tone request message to the first communication hub and wherein;
the first communication hub is configured to process the call tone request message to provide call tones to the first call device.

28. The communication system of claim 27 wherein the first communication hub is configured to provide a confirmation message to the second communication hub and the second communication hub is configured to process the confirmation message to ring the second call device.

29. The communication system of claim 28 wherein the second communication hub is further configured to receive an off-hook signal from the second call device and process the off-hook signal to stop ringing the second call device.

30. The communication system of claim 29 wherein the second communication hub is configured to provide an in-band stop call tones message to the first communication hub responsive to receiving the off-hook signal and the first communication hub is configured to process the stop call tones message to stop providing the call tones to the first call device.

31. The communication system of claim 30 wherein the first communication hub and second communication hub are connected to a communication network.

32. The communication system of claim 31 wherein the communication network is a packet network.

33. The communication system of claim 32 wherein the second communication hub is connected to a second communication network.

34. The communication system of claim 33 wherein the second communication network is the public switched telephone network.

35. The communication system of claim 33 wherein the second communication network is an internet.

36. The communication system of claim 27, wherein the call tones are ringback tones.

37. The communication system of claim 27 wherein the call tones are busy signal tones.

38. The communication system of claim 27 wherein the call tones are reorder tones.

39. The communication system of claim 27 wherein at least one of the first communication hub and the second communication hub is a switch.

40. The communication system of claim 27 wherein at least one of the first communication hub and the second communication hub is a voice gateway.

41. The communication system of claim 27 wherein at least one of the first communication hub and the second communication hub is a residential communication hub.

42. A method of operating a communication system having a first communication hub and a second communication hub, the method comprising:
transmitting a call tone request message in-band from the second communication hub connected to a second call device;
receiving the call tone request message in the first communication hub connected to a first call device; and
processing the call tone request message in the first communication hub to provide call tones to the first call device.

43. The method of claim 42 further comprising:
transmitting a confirmation message from the first communication hub to the second communication hub;
receiving the confirmation message in the second communication hub; and
processing the confirmation message in the second communication hub to ring the second call device.

44. The method of claim 43 further comprising:
receiving an off-hook signal in the second communication hub from the second call device; and
processing the off-hook signal in the second communication hub to stop ringing the second call device.

45. The method of claim 44 further comprising:
transmitting an in-band stop call tones message from the second communication hub to the first communication hub in response to receiving the off-hook signal;
receiving the stop call tones message in the first communication hub; and
processing the stop call tones message to stop providing the call tones to the first call device.

46. The method of claim 45 wherein the first communication hub and second communication hub are connected to a communication network.

47. The method of claim 46 wherein the communication network is a packet network.

48. The method of claim 46 wherein the second communication hub is connected to a second communication network.

49. The method of claim 48 wherein the second communication network is the public switched telephone network.

50. The method of claim 48 wherein the second communication network is an internet.

51. The method of claim 48, wherein the call tones are ringback tones.

52. The method of claim 48 wherein the call tones are busy signal tones.

53. The method of claim 48 wherein the call tones are reorder tones.

54. The method of claim 48 wherein at least one of the first communication hub and the second communication hub is a switch.

55. The method of claim 48 wherein at least one of the first communication hub and the second communication hub is a voice gateway.

56. The method of claim 48 wherein at least one of the first communication hub and the second communication hub is a residential communication hub.

* * * * *